(12) United States Patent
Andersen

(10) Patent No.: US 6,363,398 B1
(45) Date of Patent: *Mar. 26, 2002

(54) DATABASE ACCESS USING ACTIVE SERVER PAGES

(75) Inventor: Todd Andersen, Meridian, ID (US)

(73) Assignee: Micron Electronics, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/351,927

(22) Filed: Jul. 12, 1999

Related U.S. Application Data

(63) Continuation of application No. 08/978,032, filed on Nov. 25, 1997, now Pat. No. 5,999,941.

(51) Int. Cl.[7] .......................... G06F 17/00; G06F 17/30
(52) U.S. Cl. ........................ 707/103; 707/104; 707/10
(58) Field of Search ................................ 707/100–104, 707/1–6, 10

(56) References Cited

U.S. PATENT DOCUMENTS

| | | | | |
|---|---|---|---|---|
| 5,206,951 A | 4/1993 | Khoyi et al. | ................ | 395/650 |
| 5,659,729 A | * 8/1997 | Nielsen | .......................... | 707/3 |
| 5,778,356 A | 7/1998 | Heiny | ............................. | 707/2 |
| 5,809,502 A | 9/1998 | Burrows | ........................ | 707/7 |
| 5,864,863 A | 1/1999 | Burrows | ..................... | 707/103 |
| 5,878,418 A | 3/1999 | Polcyn et al. | ................. | 707/10 |
| 5,999,941 A | * 12/1999 | Andersen | .................... | 707/103 |

* cited by examiner

*Primary Examiner*—Hosain T. Alam
*Assistant Examiner*—Alford W. Kindred
(74) *Attorney, Agent, or Firm*—Park, Vaughan & Fleming LLP

(57) ABSTRACT

A method and system for accessing a database management system running on a server computer from within a JAVA applet running on a client computer. The JAVA applet prepares a URL to address an active server page on the server computer, embedding a database query within the URL. The JAVA applet then accesses the active server page using the prepared URL. The server computer, upon receiving a request for access to the active server page, executes a script stored within the active server page that receives the database query embedded within the URL, passes the query to the database management system, receives from the database management system the query results, creates a HTML document, and stores the query results in the HTML document. The server computer then returns the HTML document to the client computer, where the JAVA applet reads the query results from the HTML document.

4 Claims, 4 Drawing Sheets

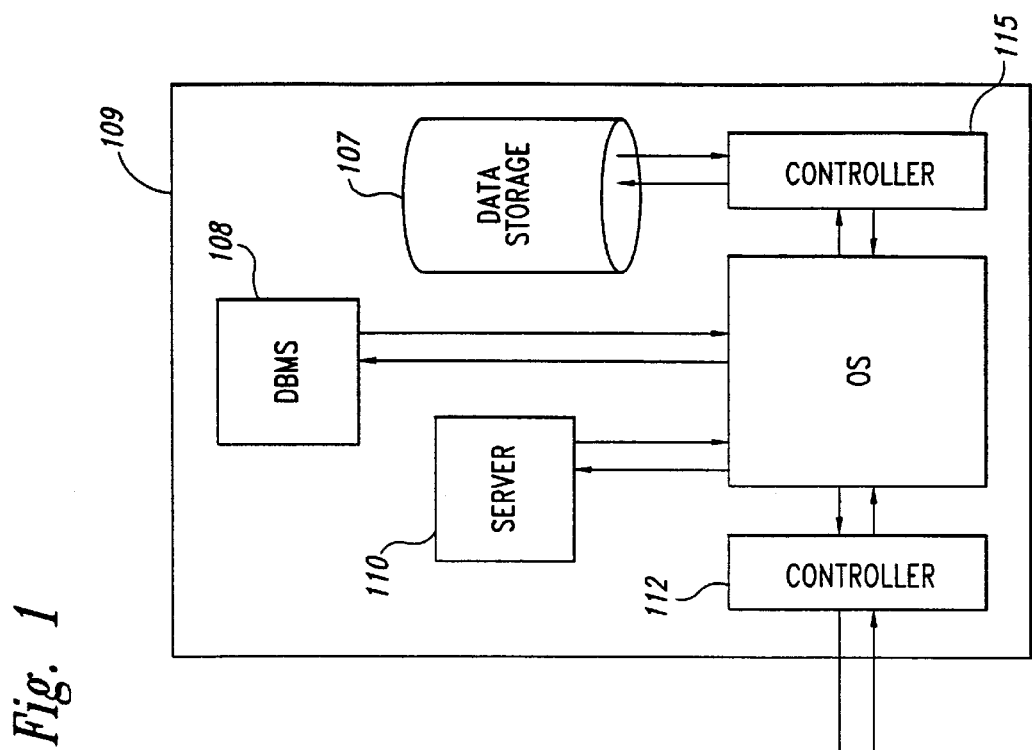
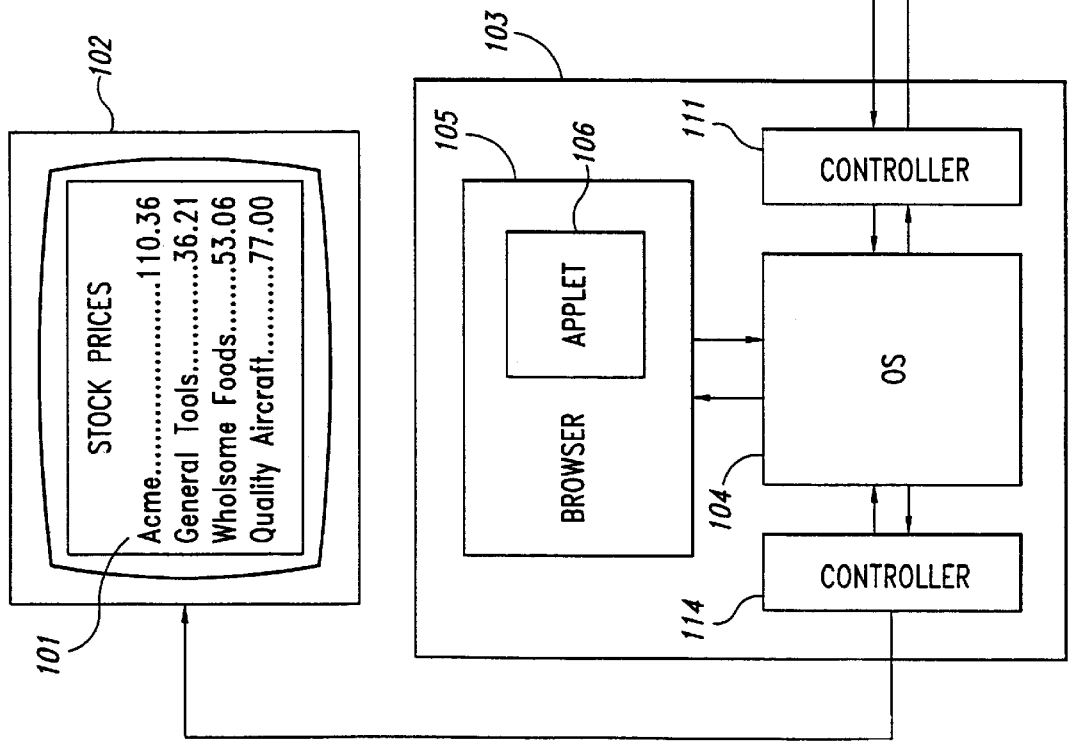
Fig. 1

DATABASE ACCESS USING ACTIVE SERVER PAGES

CROSS-REFERENCE TO RELATED APPLICATION

This application is a continuation of U.S. patent application Ser. No. 08/978,032, filed Nov. 25, 1997, now U.S. Pat. No. 5,999,941.

TECHNICAL FIELD

The present invention relates to computer database access and, in. particular, to access to a database on one computer by a JAVA applet running on a second computer.

BACKGROUND OF THE INVENTION

The development of communications networks, personal computers, and client-server network applications has led to frequent access of data stored in database management systems on server computers by application programs running on client computers. Commonly, a client computer establishes a TCP/IP connection to the server computer on which the database management system runs and then sends queries to the database management system and receives responses to those queries via the TCP/IP protocol. The server computer includes a process which listens for TCP/IP connection requests, establishes TCP/IP connections in response to those requests, and establishes connections to the database management system corresponding to the TCP/IP connections. The process forwards incoming queries from client computers through the TCP/IP connections to the corresponding database connections, collects data furnished by the database management system in response to the queries, and forwards the collected data back to the corresponding client computers through the TCP/IP connections.

With the rapid increase in the use of the Internet, web browser applications have become a very common and convenient means for client computer users to access information stored on server computers. Initially, web browsers were capable of retrieving hypertext markup language ("HTML") documents from a remote server over the Internet and graphically displaying the HTML documents to the web browser user. As web browsers have become more sophisticated, they can now not only receive HTML documents from server computers, but can also receive JAVA programs from server computers and execute the JAVA programs on the client computer under the direction and monitoring of the web browser. These JAVA programs, known as applets, can provide a far more interactive and dynamic display of information than that achieved by displaying static HTML documents. However, JAVA applets give rise to a number of serious administrative and security problems. If the applet was able to have free access to the full range of operating system calls accessed by application programs, then a web browser user could inadvertently download from the Internet a capricious program that disrupts the state of the client computer, including changing the client computer's configuration settings, that damages or destroys the client computer's file system and the contents of the client computer's files, or that rifles the contents of the client computer and transmit those contents back to an even more capricious program running on a server computer. For these reasons, the executing applet is closely guarded and monitored by the web browser, and its access to client and server resources is severely restricted.

It has become very desirable for JAVA applet developers to be able to write applets that can access database information from server computers. FIG. 1 displays a stock price quoting system implemented using a JAVA applet. This stock price quoting system demonstrates both the need for access to server database management systems by a JAVA applet and the problems that currently make such access difficult to achieve. The stock price quoting system displays a list of stocks and prices 101 on a display monitor 102 of a personal computer 103. The processes executing on the personal computer include the operating system 104, a browser 105, and the JAVA applet executing under control of the browser 106 that acquires the stock prices and directs their display. The stock prices are stored on a data storage device 107 managed by a database management system 108 on a server computer 109. In order to obtain the stock prices, the applet needs to direct the browser 105 to, in turn, direct the operating system of the personal computer 104 to request a connection to a server process 110 running on the server computer. Once a connection has been established, the applet 106 then directs the browser to transmit one or more stock price database queries to the server process 110 which forwards the queries to the database management system 108. The database management system executes the queries against stock price data stored in the data storage device 107 in order to obtain the response stock price data, and then directs the server process 110 to transfer the response stock price data back to the applet 106. Finally, the applet directs the browser via the operating system of the personal computer to display the response stock price data in a stock price report on the display monitor. The data transfer between the personal computer and the server computer occurs through network controller hardware devices 111 and 112 over telephone lines, a local area network 113 or a wide area network. Additional controllers 114 and 115 mediate transfer of data from the personal computer to the display monitor of the personal computer and from the data storage device to the server operating system.

Because the applet is restricted in its ability to access resources, including the database management system, devising a general access strategy for accessing database management systems from an applet, as in the above example, has proved to be a difficult problem. There is, for example, no standard method for an applet to employ TCP/IP sockets in order to access remote database management systems. While access using TCP/IP is possible, a TCP/IP based server process would need to be developed to run on the server computers that contain the database management systems. Development of such a server process requires carefill attention to details involved in handling error conditions that arise because of network and database errors. In addition, careful attention would be required to considerations of the number of connections allowable on a server and to considerations of the practical limitations to connectivity arising from database management systems and from bandwidth limitations of the local area network or telephone lines by which data is transferred. Another possible method is the JDBC-ODBC bridge. JDBC was developed for JAVA and allows JAVA applets to access a database management system using a driver written in JAVA for each particular type of database management system. This method has the drawback that development of the drivers can be quite difficult, code writing and debugging under JDBC can be complex, additional software needs to be added to the personal computer that uses native calls that are not compatible with all browsers, and the applet must adhere to a number of security requirements. Because applets have relatively free access to HTML pages unconstrained by security requirements, a third method might employ placing the stock price data into HTML pages rather than into a database management system, so that the applet could access the data directly. The disadvantage in this method is that storing the stock price data in static HTML pages can be quite inefficient, and data stored in this manner is not amenable to incremental updates and easy and efficient ad hoc searching and manipulation. A need has therefore been recognized for a technique that allows an applet running on a client computer to easily access a database management system running on a server computer.

SUMMARY OF THE INVENTION

An embodiment of the present invention provides a method and system for accessing a database management system running on a server computer from within a JAVA applet running on a client computer. The JAVA applet prepares a uniform resource locator ("URL") with which to address an active server page on the server computer, embedding within the URL a database query. The JAVA applet then accesses the active server page using the prepared URL as an address in the same way that the JAVA applet would access a HTML page. Upon receiving the request for access to the active server page, the server computer executes a script stored within the active server page that receives from the server computer the database query embedded within the URL, passes the database query to the database management system, receives from the database management system the query results, creates. a HTML document, and stores. the query results in the HTML document. The server computer then returns the HTML document to the client computer, where the JAVA applet opens the returned HTML document and reads the query results from the HTML document in the same manner as the JAVA applet would open and read data from a text file.

BRIEF DESCRIPTION OF THE DRAWINGS

FIG. 1 displays a stock price quoting system implemented using a JAVA applet.

DETAILED DESCRIPTION OF THE INVENTION

An embodiment of the present invention provides a technique for accessing database management systems running on server computer from within a JAVA applet running on a client computer. This technique avoids the general security issues involved in accessing resources from a JAVA applet and is efficient from a development standpoint. This technique may employ the Microsoft active server page technology that was created to allow client computers to launch tasks on server computers and to receive the results from execution of those tasks. The JAVA applet accesses an active server page on the server computer in the same fashion as it would normally access an HTML page. The applet can pass a database query to the active server page on a server computer by including the database query within the URL by which the applet addresses the active server page. The server computer receives the query and passes it to a program contained in the active server page. The active server page is essentially a file containing a program written in a script language such as Visual Basic. That program executes the query by passing the query to a database management system, receives the result from the query, and formats the result into an HTML page. The server returns the HTML page constructed by the active server page program to the applet. The applet then reads the query response data that it has requested from the database management system from the returned HTML page. The query response data is formatted in a predetermined format by the active server page program and can be read from the HTML page in the same fashion that lines are read from a normal text file. In other words, the applet does not need to cause the HTML page to be displayed by the browser, but can access the HTML page only in order to extract from the HTML page the query response data.

The security problems that would arise from an attempt to directly connect to the database management system from within a JAVA applet are thus completely avoided in the active server page implementation. Only well-known functions for requesting an HTML document via a URL from a client computer and well-known functions for reading the contents of a text file need be employed to achieve database access from within the JAVA applet. The active server page functionality is a standard feature of the Microsoft Web Server software. To create the active server page that allows for database access from a JAVA applet, a developer need use only a standard scripting language, such as Visual Basic, and common database access tools embedded within such scripting languages.

Figure 2:
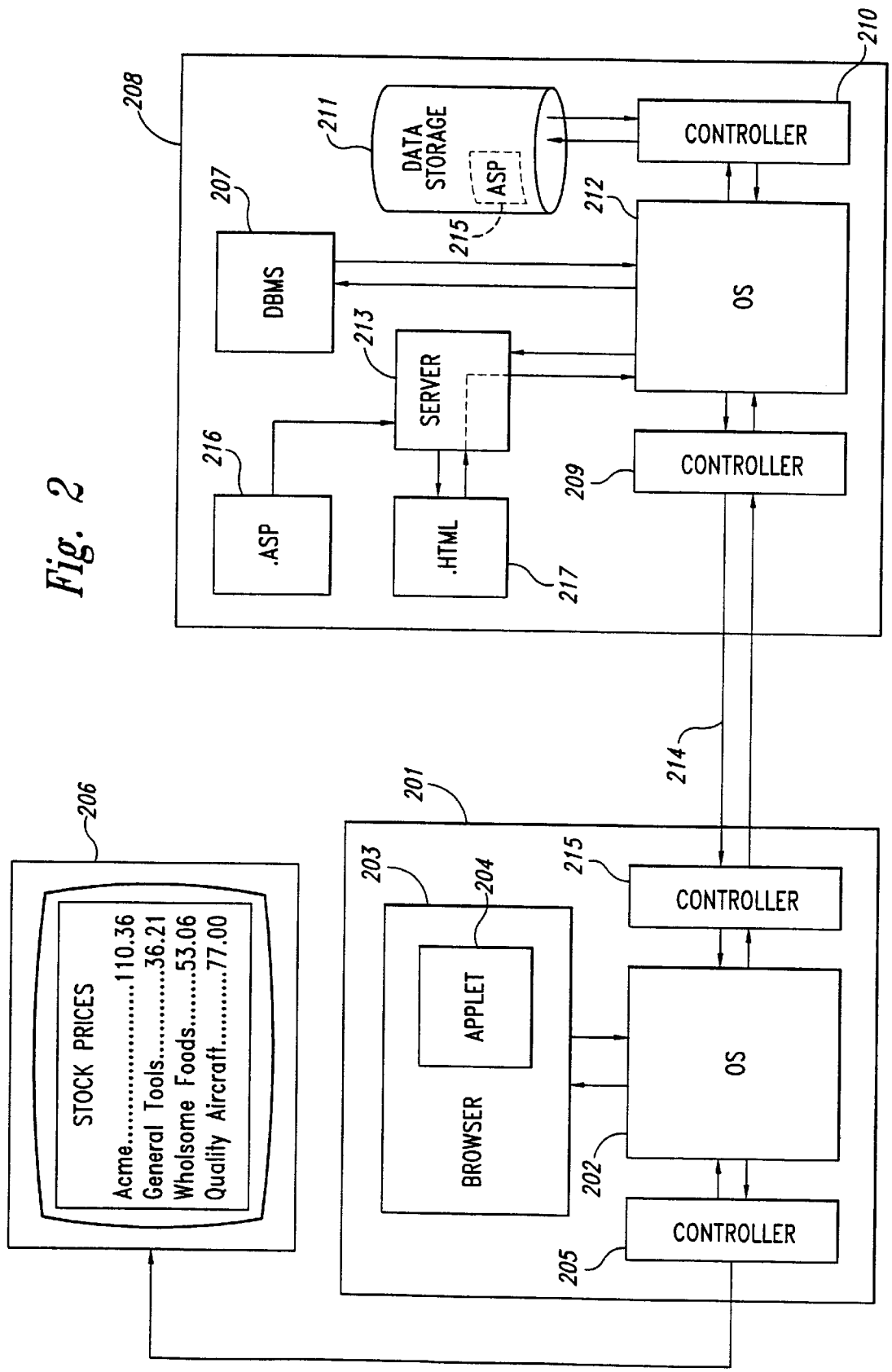
FIG. 2 displays the stock price quoting system implemented using a JAVA applet and active server pages.

FIG. 2 displays the stock price quoting system implemented using active server pages. As in FIG. 1, the stock price quoting system comprises a personal computer 201 that includes an operating system 202 process, a web browser 203 process, and a stock price quoting system applet 204 process. As in FIG. 1, stock prices are formatted and transmitted by the applet 204 via the operating system 202 and a hardware controller 205 to the display monitor of the personal computer 206. The applet obtains the stock prices from a database management system 207 running on a server computer 208. The server computer includes device controllers 209 and 210, a data storage device 211, an operating system 212, and a server process 213 which monitors incoming data requests from client computers over the Internet or telephone lines 214. An active server page 215 is stored on the data storage device and is instantiated in memory 216 by the server process via the operating system. When the applet 204 requests the active server page using a URL for that active server page, the server instantiates the active server page in memory and causes the script within the active server page to be executed on the server computer. Execution of the script produces an HTML document 217. The server then transmits that HTML document via the operating system and the Internet or telephone lines through the operating system and network device controller of the server computer to the network device controller 219 on the personal computer from which the data corresponding to the HTML document is collected by the operating system and passed through the browser back to the applet.

There are many advantages to this technique of providing database access to JAVA applets via active server pages. The applet portion of the technique can be developed using pure JAVA language facilities. No additions to the JAVA language are needed nor is there a need for embedding calls to functionality external to JAVA. The active server page facility on the server computer is a standard feature of the Windows NT operating system, and therefore requires no development. Active server page scripts are easily developed, debugged and tested using powerful and commonly available development tools for the Visual Basic scripting language. There are no security issues, since the applet makes no attempt to access resources other than HTML pages via normal URL-specified access. Finally, applets developed using this technique can be imported and run by any web browser.

Figure 3:
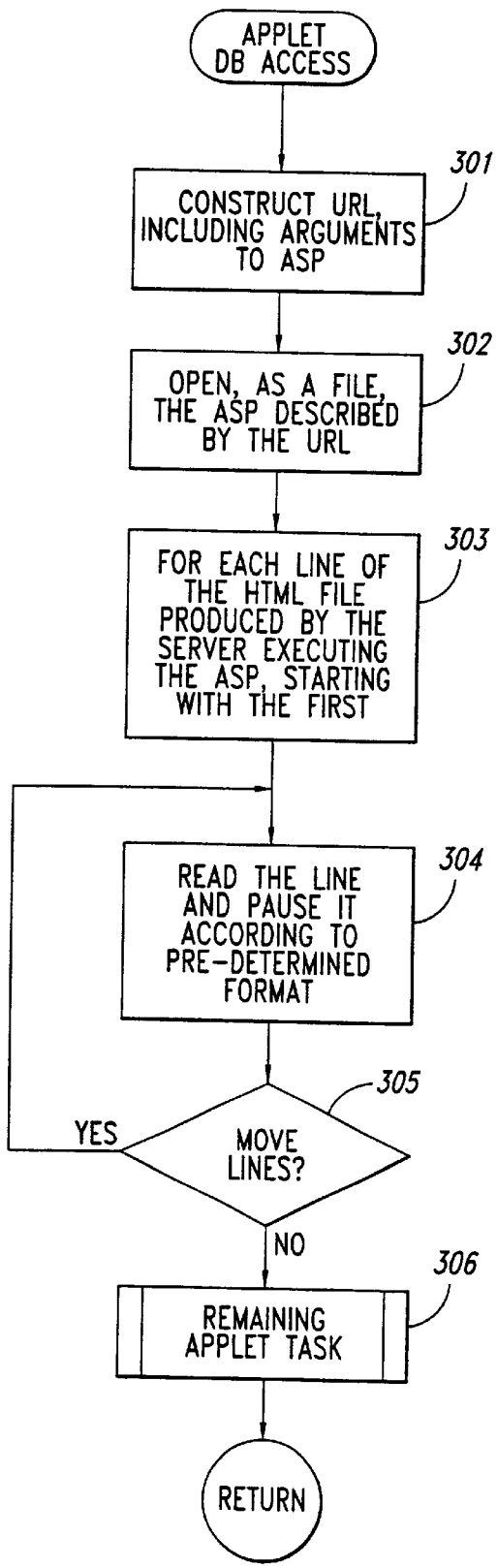
FIG. 3 displays a flow control diagram for the database access portion of a JAVA applet.

FIG. 3 displays a flow control diagram for the database access portion of a JAVA applet. The JAVA applet constructs a URL for an active server page that includes a database query, requests a HTML file from a server computer using the URL, and reads the query results from the HTML file returned by the server computer. In step 301, the applet constructs a URL to address the active server page developed to facilitate database access. The applet formats arguments to be passed to the active server page into the character string representation of the URL. In step 302, the applet uses standard JAVA functions to open the active server page, addressed by the URL, as a file. Either this step, or the first execution of step 304, below, launches a request message from the client computer to the server computer in response to which the server computer returns an HTML document containing the results of the database query. Steps 303–305 represent a loop in which the applet processes each line of the HTML document returned by the server computer in response to the access of the active server page by the applet. In step 304, the applet reads a line from the returned HTML document and parses it according to a predetermined format in which data from the database query response was placed into the HTML file by execution of the script of the active server page. Either in this step, or in step 306, the applet uses the data parsed from the received HTML file in some application dependent manner. For example, in the stock price quoting system described in FIG. 2, the applet would format the name and price of the stock into the format of the stock prices report and would direct the display monitor to display a list of the formatted names and prices received from the server computer.

Figure 4:
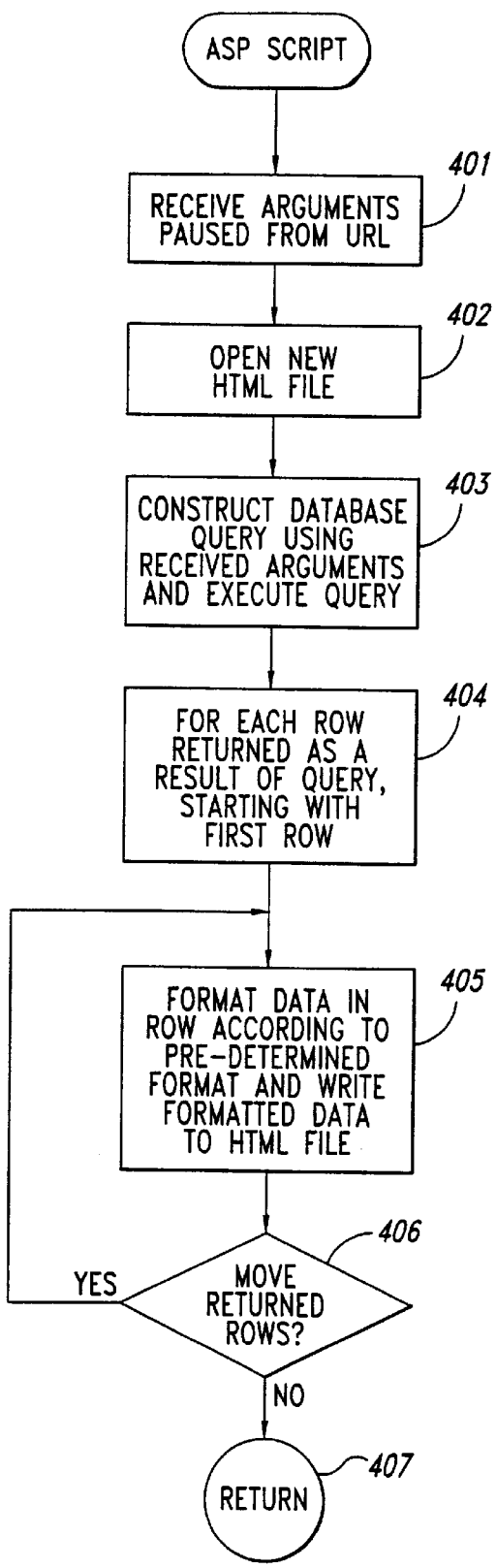
FIG. 4 displays a flow control diagram for a simple active server page script implementation for a stock price quoting system.

FIG. 4 displays a flow control diagram for an active server page script implementation of the server side of the stock price quoting system. The script prepares a database query, passes the database query to a database management system for execution, and prepares a HTML page that includes the results of the database query execution returned to the script by the database management system. In step 401, the active server page script uses standard script language features to receive arguments that were packed into the URL by the applet. In step 402, the active server page script opens a new HTML file into which it will place data returned by the database management system in response to a query. In step 403, the active server page script uses standard script language features to construct a database query from the received arguments and to execute that query against a database management system running on the sever computer. Steps 404–406 represent a loop in which the active server page script receives each row returned as a result of the execution of the query, in the case of a relational database system, formats the data in the manner expected by the applet which will receive the data, and writes the formatted data to the HTML file. When the active server page script finishes, in step 407, the HTML file prepared by the script is returned by the server operating system and communication modules to the requesting applet.

The following pseudocode routine "stock_report" demonstrates an implementation of the client or applet side of tHe stock price quoting system:

```
1  public void stock_report()
2  {
3      String res:
4      String url_address =
             "http://stock_queries/database.asp ?QUERY =
                 SELECT NAME, PRICE FROM STOCKPRICES";
5      URL u;
6      InputFile inp;
7      Output out;
8
9      u = new URL (url_address);
10     inp = u.openInput;
11     out.printTitle ("Stock Prices");
12     while (res = inp. NextLine() ! = null)
13     {
14         out.printEntry (res. "_");
15     }
16 }
```

On line 4, the URL, with which the active server page on the server will be addressed by the applet, is constructed by stock report and placed in the string url_address. Note that the portion of the URL following the question mark represents an argument or a parameter, called "QUERY," that will be passed to the script that will be run by the server computer in response to access of the active age. Stock_report employs several generalized classes, including classes for URL-mediated access to server pages, for input from an HTML file, and for output to the display monitor, instantiated as objects "U" on line 5, "inp" on line 6, and "OUT " on line 7, respectively. On line 9, stock_report prepares to access the active server page via the URL by instantiating the URL object "u." On line 10, stock_report sends the URL string "url_address" to the server, requesting access to the active server page described by the URL, and directs the input object "inp " to read input from the HTML page returned by the server in reponse to the request for access to the active server page. On line 11, the stock_report prints out the title "Stock Prices" to the display monitor. In the loop 12–15, stock report reads each line of the HTML file returned in response to access of the active server page by stockreport and prints out an entry on the display monitor for the particular stock and price contained in the line.

The following pseudocode script represents the server side implementation of the stock price quoting system:

1 Database DB

2 HTML_$_{File\ ht}$

3 String query 4 ht.Open()

5 query=GetArg (QUERY)

6 DB.Connect ("stock report database")

7 DB.Execute (query)

8 while (! DB.ResultSetEmpty())

9 {

10 ht.WriteLine (DB. GetNextRowo)

11 }

12 ht.Close()

In this pseudo script language routine, a database object "DB," an HTML file "ht " and a string "query," are declared on lines 1–3. On line 5, the script opens the HTML file. On line 6, the script calls a built-in finction "GetArg" to retrieve the parameter "QUERY" from the URL by which the active server page is addressed. On line 7, the script connects to the database "stock report database." On line 8, the script executes the query obtained as a parameter from the URL.

In the loop represented by lines 9–12, the script retrieves each row from the set of rows that represents the result of query execution from the database management system, and on line 11, formats and writes out those rows to the HTML file. The script closes the HTML file on line 13 and returns. Once the script has ended, the operating system transfers the HTML file prepared by the script back to the requesting applet.

Although the present invention has been described in terms of one embodiment, it is not intended that the invention be limited to this embodiment. Modifications within the spirit of the invention will be apparent to those skilled in the art. For example, the active server page can be implemented in any of the script languages supported by the Microsoft active server page facility. The queries and the responses to those queries can be formatted in any manner conducive to storage within an HTML page. More than one query can be sent during a single access to any given active server page. The active server page can be implemented to use an existing database connection which is kept open over the lifetime of the server process, or can connect to the database management system each time a query is processed. Parameters encoded within the URL string may direct the active server page to connect to any number of different databases. The scope of the present invention is defined by the claims that follow.

What is claimed is:

1. A program storage device containing computer code that enables a client computer system to:

construct a uniform resource locator that identifies an active server page on a server computer, the uniform resource locator including a database query encoded as an argument;

send to the server computer a request to access the active server page identified by the uniform resource locator, the sending of the request causing the server to invoke a script within the active server page that causes the database query to be executed and that packages results from the database query execution into a hypertext markup language document and causing the server computer to return the hypertext markup language document containing the results from the database query execution to the client computer; and receive the returned hypertext markup language document from the server computer and read from the hypertext markup language document the results of the database query execution.

2. The program storage device of claim 1 wherein the computer code contains at least computer code of a JAVA applet.

3. A personal computer configured to access a database management system running on a server computer, the personal computer comprising circuitry configured to:

construct a uniform resource locator that identifies an active server page on the server computer, the uniform resource locator including a database query encoded as an argument;

send to the server computer a request to access the active server page identified by the uniform resource locator, the sending of the request causing the server to invoke a script within the active server page that causes the database query to be executed and that packages results from the database query execution into a hypertext markup language document and causing the server computer to return the hypertext markup language document containing the results from the database query execution to the program; and receive the returned hypertext markup language document from the server computer and read from the hypertext markup language document the results of the database query execution.

4. The personal computer of claim 3 wherein the personal computer is running a JAVA applet.

* * * * *